(12) United States Patent
Ishii et al.

(10) Patent No.: US 7,595,927 B2
(45) Date of Patent: Sep. 29, 2009

(54) SPATIAL LIGHT MODULATOR WITH SUB-WAVELENGTH STRUCTURE

(75) Inventors: Fusao Ishii, Menlo Park, CA (US); Yoshihiro Maeda, Hachioji (JP); Hirotoshi Ichikawa, Hchioji (JP)

(73) Assignees: Olympus Corporation (JP); Silicon Quest Kabushiki Kaisha (JP)

( * ) Notice: Subject to any disclaimer, the term of this patent is extended or adjusted under 35 U.S.C. 154(b) by 13 days.

(21) Appl. No.: 11/823,947

(22) Filed: Jun. 29, 2007

(65) Prior Publication Data

US 2008/0002155 A1 Jan. 3, 2008

Related U.S. Application Data

(63) Continuation-in-part of application No. 11/121,543, filed on May 4, 2005, which is a continuation-in-part of application No. 10/698,620, filed on Nov. 1, 2003, and a continuation-in-part of application No. 10/699,140, filed on Nov. 1, 2003, and a continuation-in-part of application No. 10/699,143, filed on Nov. 1, 2003.

(60) Provisional application No. 60/818,059, filed on Jun. 30, 2006.

(51) Int. Cl.
*G02B 26/00* (2006.01)
(52) U.S. Cl. ...................................... 359/291; 359/290
(58) Field of Classification Search ................. 345/690; 359/290, 291, 292, 295
See application file for complete search history.

(56) References Cited

U.S. PATENT DOCUMENTS

| 5,168,406 | A | | 12/1992 | Nelson |
| 5,240,818 | A | | 8/1993 | Mignardi et al. |
| 5,337,183 | A | * | 8/1994 | Rosenblatt .................. 359/248 |
| 5,452,138 | A | | 9/1995 | Mignardi et al. |
| 5,868,480 | A | | 2/1999 | Zeinali |
| 6,552,842 | B2 | * | 4/2003 | Simpson et al. ............. 359/318 |
| 6,590,695 | B1 | * | 7/2003 | Kurtz et al. .................. 359/291 |
| 6,781,731 | B2 | | 8/2004 | Choi |
| 6,807,010 | B2 | | 10/2004 | Kowarz |
| 6,919,885 | B2 | | 7/2005 | Maeda |
| 7,006,275 | B2 | | 2/2006 | Huibers |
| 7,019,376 | B2 | | 3/2006 | Patel et al. |
| 7,025,464 | B2 | * | 4/2006 | Beeson et al. .................. 353/98 |
| 2007/0071061 | A1 | * | 3/2007 | Pietra et al. ................. 372/102 |
| 2008/0013157 | A1 | * | 1/2008 | Ishii et al. .................... 359/298 |

* cited by examiner

*Primary Examiner*—David N Spector
(74) *Attorney, Agent, or Firm*—Bo-In Lin

(57) ABSTRACT

An image projection device receives a light emitted from a light source through an illumination optic for projecting to a spatial light modulator (SLM) having a plurality of deflectable micromirrors The micromirrors further formed with a sub-wavelength microstructure on a reflective surface of the micromirrors having a reflection guided mode resonant grating to take advantage of an ultra-fine processing technology available in recent years used in semiconductor manufacture and micro-machining to fabricate a sub-wavelength grating (SWG) having a pitch between the grating ridges that is smaller than the wavelength of light.

18 Claims, 13 Drawing Sheets

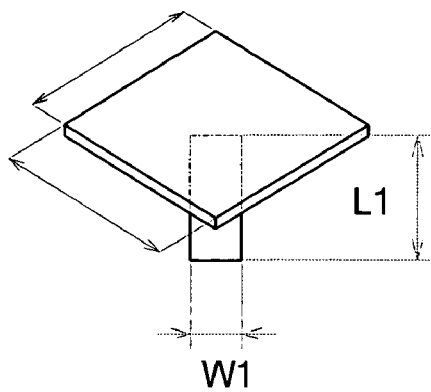
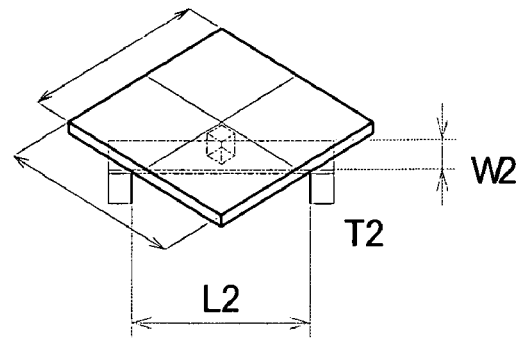
Fig. 5A                   Fig. 5B
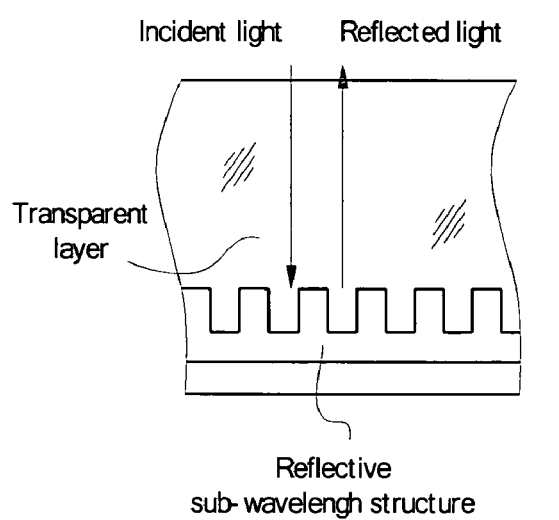
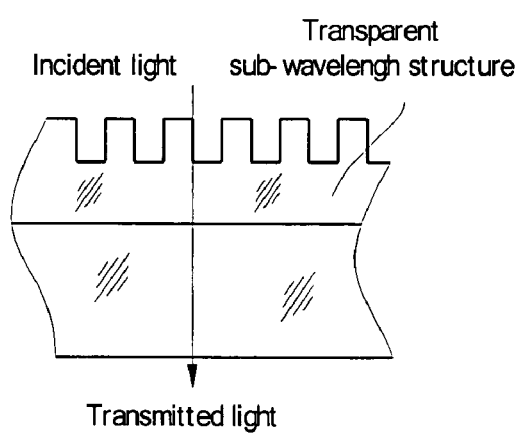
Fig. 6A                   Fig. 6B

SPATIAL LIGHT MODULATOR WITH SUB-WAVELENGTH STRUCTURE

This application is a Non-provisional Application of a Provisional Application 60/818,059 filed on Jun. 30, 2006. This Application is also a Continuation in Part (CIP) Application of a pending U.S. patent application Ser. No. 11/121,543 filed on May 4, 2005. The application Ser. No. 11/121,543 is a Continuation in part (CIP) Application of three previously filed Applications. These three Applications are Ser. Nos. 10/698,620 filed on Nov. 1, 2003, 10/699,140 filed on Nov. 1, 2003, and 10/699,143 filed on Nov. 1, 2003 by one of the Applicants of this Patent Application. The disclosures made in these Patent Applications are hereby incorporated by reference in this Patent Application.

FIELD OF THE INVENTION

This invention relates to image display systems. More particularly, this invention relates to a display system with a spatial light modulator that includes sub-wavelength grating implemented as microstructure disposed on a flexible, deflectable surface of micromirrors for enhancing flexibility in the control and display of images.

BACKGROUND OF THE INVENTION

Even though there have been significant advances made in recent years in the technology of implementing electromechanical micromirror devices as spatial light modulators, there are still limitations and difficulties when these are employed to provide high quality image displays. Specifically, when the display images are digitally controlled, the image qualities are adversely affected due to the fact that the image is not displayed with a sufficient number of gray scales.

Electromechanical micromirror devices have drawn considerable interest because of their application as spatial light modulators (SLMs). A spatial light modulator requires an array of a relatively large number of micromirror devices. In general, the number of devices required ranges from 60,000 to several million for each SLM. FIG. 1A refers to a digital video system 1, disclosed in a relevant U.S. Pat. No. 5,214,420, that includes a display screen 2. A light source 10 is used to generate light energy for the ultimate illumination of display screen 2. Light 9 generated is further concentrated and directed toward lens 12 by mirror 11. Lens 12, 13 and 14 form a beam columnator, which operates to columnate light 9 into a column of light 8. A spatial light modulator 15 is controlled by a computer 19 through data transmitted over data cable 18 to selectively redirect a portion of the light from path 7 toward lens 5 to display on screen 2. As shown in FIG. 1B, the SLM 15 has a surface 16 that includes an array of switchable reflective elements, e.g., micromirror devices 32, such as elements 17, 27, 37, and 47 as reflective elements attached to a hinge 30. When element 17 is in one position, a portion of the light from path 7 is redirected along path 6 to lens 5, where it is enlarged or spread along path 4 to impinge onto the display screen 2 so as to form an illuminated pixel 3. When element 17 is in another position, light is not redirected towards display screen 2 and hence pixel 3 remains dark.

The on-and-off states of the micromirror control scheme, as that implemented in the U.S. Pat. No. 5,214,420 and by most of the conventional display systems, impose a limitation on the quality of the display. Specifically, in a conventional configuration of the control circuit, the gray scale (PWM between ON and OFF states) is limited by the LSB (least significant bit, or the least pulse width). Due to the on-off states implemented in the conventional systems, there is no way to provide a shorter pulse width than LSB. The least brightness, which determines gray scale, is the light reflected during the least pulse width. The limited gray scales lead to degradations of image display.

Specifically, FIG. 1C exemplifies a conventional circuit diagram of control circuit for a micromirror, according to the U.S. Pat. No. 5,285,407. The control circuit includes memory cell 32. Various transistors are referred to as "M*" where "*" designates a transistor number and each transistor is an insulated gate field effect transistor. Transistors M5, and M7 are p-channel transistors; transistors M6, M8, and M9 are n-channel transistors. The capacitances, C1 and C2, represent the capacitive loads of the memory cell 32. Memory cell 32 includes an access switch transistor M9 and a latch 32a, which is the basis of the static random access switch memory (SRAM) design. All access transistors M9 in a row receive a DATA signal from a different bit-line 31a. The particular memory cell 32 to be written is accessed by turning on the appropriate row select transistor M9, using the ROW signal functioning as a word-line. Latch 32a is formed from two cross-coupled inverters, M5/M6 and M7/M8, which permit two stable states. State 1 is Node A high and Node B low and state 2 is Node A low and Node B high.

The mirror is driven by a drive electrode which abuts a landing electrode formed separately from the drive electrode and is held at a predetermined inclination angle. An elastic "landing chip" is formed on the portion of the landing electrode that makes contact with the mirror and assists in deflecting the mirror in the opposite direction when the control is switched. The landing chip is designed to have the same potential as the landing electrode so that there will be no short circuit through contact. Each mirror formed on a device substrate has a square or rectangular shape, and each side has a length of 4 to 15 um. In this configuration, a portion of the reflected light is reflected not from the mirror surface but from the gaps between the mirrors or other surfaces of the mirror device. These "unintentional" reflections are not applied to project an image, however, are inadvertently generated and may interfere with the reflected light for image display. The contrast of the displayed image is degraded due to the interference generated from these unintentional reflections generated by the gaps between the mirrors. In order to overcome such problems, the mirrors are arranged on a semiconductor wafer substrate with a layout to minimize the gaps between the mirrors. One mirror device is generally designed to include an appropriate number of mirror elements, wherein each mirror element is manufactured as a deflectable mirror on the substrate for displaying a pixel of an image. The appropriate number of elements for displaying an image is configured in compliance with the display resolution standard according to the VESA Standard defined by Video Electronics Standards Association or by television broadcast standards. When a mirror device is configured with the number of mirror elements in compliance with WXGA (resolution: 1280 by 768) defined by VESA, the pitch between the mirrors of the mirror device is 10 μm, and the diagonal length of the mirror array is about 0.6 inches.

The dual-state switching, as illustrated by the control circuit, controls the micromirrors to position either at an ON or an OFF orientation, as that shown in FIG. 1A. The brightness, i.e., the gray scales of display for a digitally control image system, is determined by the length of time the micromirror stays at an ON position. The length of time a micromirror is controlled at an ON position is in turned controlled by a multiple bit word. For simplicity of illustration, FIG. 1D shows the "binary time intervals" when controlled by a fourbit word. As shown in FIG. 1D, the time durations have relative values of 1, 2, 4, 8 that in turn define the relative brightness for each of the four bits, where 1 is for the least significant bit and 8 is for the most significant bit. According to the control mechanism as shown, the minimum controllable differences between gray scales is a brightness represented by a "least significant bit" that maintains the micromirror at an ON position.

For example, assuming n bits of gray scales, one time frame is divided into $2^n-1$ equal time periods. For a 16.7-millisecond frame period and n-bit intensity values, the time period is $16.7/(2^n-1)$ milliseconds. Having established these times for each pixel of each frame, pixel intensities are quantified such that black is a 0 time period, the intensity level represented by the LSB is 1 time period, and the maximum brightness is $2_n-1$ time periods. Each pixel's quantified intensity determines its ON-time during a time frame. Thus, during a time frame, each pixel with a quantified value of more than 0 is ON for the number of time periods that correspond to its intensity. The viewer's eye integrates the pixel brightness so that the image appears the same as if it were generated with analog levels of light.

For controlling deflectable mirror devices, the PWM applies data to be formatted into "bit-planes", with each bit-plane corresponding to a bit weight of the intensity of light. Thus, if the brightness of each pixel is represented by an n-bit value, each frame of data has the n-bit-planes. Then, each bit-plane has a 0 or 1 value for each mirror element. According to the PWM control scheme described in the preceding paragraphs, each bit-plane is independently loaded and the mirror elements are controlled according to bit-plane values corresponding to the value of each bit during one frame. Specifically, the bit-plane according to the LSB of each pixel is displayed for 1 time period.

When adjacent image pixels are shown with a great degree of difference in the gray scales, due to a very coarse scale of controllable gray scale, artifacts are shown between these adjacent image pixels. That leads to image degradations. The image degradations are especially pronounced in the bright areas of display, where there are "bigger gaps" between gray scales of adjacent image pixels. The artifacts are generated by technical limitations in that the digitally controlled display does not provide sufficient gray scales. At the bright areas of the display, the adjacent pixels are displayed with visible gaps of light intensities.

As the mirrors are controlled to be either ON or OFF, the intensity of light of a displayed image is determined by the length of time each mirror is in the ON position. In order to increase the number of gray scales of a display, the switching speed of the ON and OFF positions for the mirror must be increased. Therefore the digital control signals need be increased to a higher number of bits. However, when the switching speed of the mirror deflection is increased, a stronger hinge for supporting the mirror is necessary to sustain the required number of switches between the ON and OFF positions for the mirror deflection. In order to drive the mirrors with a strengthened hinge, a higher voltage is required. The higher voltage may exceed twenty volts and may even be as high as thirty volts. The mirrors produced by applying the CMOS technologies are probably not appropriate for operating the mirror at such a high range of voltages, and therefore DMOS mirror devices may be required. In order to achieve a higher degree of gray scale control, more complicated production processes and larger device areas are required to produce the DMOS mirror. Conventional mirror controls are therefore faced with a technical problem in that accuracy of gray scales and range of the operable voltage have to be sacrificed for the benefits of a smaller image display apparatus.

There are many patents related to light intensity control. These Patents include U.S. Pat. Nos. 5,589,852, 6,232,963, 6,592,227, 6,648,476, and 6,819,064. There are further patents and patent applications related to different light sources. These Patents includes U.S. Pat. Nos. 5,442,414, 6,036,318 and Application 20030147052. U.S. Pat. No. 6,746,123 discloses special polarized light sources for preventing light loss. However, these patents and patent application do not provide an effective solution to overcome the limitations caused by insufficient gray scales in the digitally controlled image display systems.

Furthermore, there are many patents related to spatial light modulation including U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions have not addressed and provided direct resolutions for a person of ordinary skill in the art to overcome the above-discussed limitations and difficulties.

In view of the above problems, the inventors have disclosed, in US Patent Application 2005/0190429, another method for controlling the deflection angle of the mirror to express gray scales of an image. In this disclosure, the intensity of light obtained during the oscillation period of the mirror is about 25% to 37% of the intensity of light obtained while the mirror is held in the ON position continuously.

According to this control process, it is not necessary to drive the mirror at a high speed. Also, it is possible to provide a higher number of the gray scale using a hinge with a low elastic constant. Hence, such a control makes it possible to reduce the voltage applied to the landing electrode.

A projection apparatus using the mirror device described above is broadly categorized into two types: a single-plate projection apparatus that uses only one spatial light modulator to change the frequency (i.e. wavelength or color) of projected light over time for color display, and a multi-plate projection apparatus that uses a plurality of spatial light modulators to modulate illumination light having different frequencies and combine the modulated light for a color display.

FIG. 1E shows the configuration of a representative single-plate projection apparatus. An illumination optical system 100 includes a light source 120 that produces illumination light 110, a collector lens 130 that converges the illumination light 110, a rod integrator 140, and a second collector lens 150 that focuses the exit plane of the rod integrator onto the device.

The light source 120, the collector lens 130, the rod integrator 140 and the collector lens 150 are disposed, in this order, along the optical axis of the illumination light 110 that is emitted from the light source 120 and incident to the side of a TIR prism 160. The mirror device 210 and the TIR prism 160 are disposed along the optical axis of a projection optical system 200. The illumination light that passes through the light source optical system 100 and enters the TIR prism is reflected off the total reflection surface of the TIR prism 160 and incident on the mirror device 210 at a predetermined inclination angle. Reflected light 220 reflected off the mirror device 210 at a right angle is enlarged and projected on a screen through a projection optical system 230.

There is further provided a wavelength selection filter member 300 that alternately inserts and retracts optical filters that transmit light having different frequencies in the light path of the illumination optical system or the projection optical system. The spatial light modulator is configured to modulate the illumination light based on different color data in synchronization with the insertion and retraction of the wavelength selection filters into and out of the light path. Alternatively, as shown in FIG. 1F, several kinds of light sources 400 emitting lights of different colors, may be implemented and turned on in a time-sequential manner.

The single-plate projection apparatus described above has the advantage of a relatively simple configuration, which allows for easy adjustment. However, it also has the problem of low light usage efficiency because only light of a specific wavelength is used at any one time. Another problem is that since different colors are displayed in a time-sequential manner, if the speed of switching the colors is not fast enough, a color breakup phenomenon occurs in which a viewer perceives each of the colors as a color band.

FIG. 1G shows an exemplary multiple-plate optical configuration. In FIG. 1G, the illumination light from a light source 5210 is incident on the total reflection surface of a TIR (Total internal reflection) prism 5311 at a specified angle and guided to a prism for color composition/separation. The TIR prism 5311 separates the light path of the illumination light from the light path of the modulated light. The color composition/separation prism includes a first color separation/composition prism 5312 and a first joined prism, in which a second color composition prism 5313 is joined with a third color composition prism. The first color separation/composition prism 5312 has a first dichroic film on the exit plane that reflects only red light and transmits other colors. The red illumination light reflected off the first dichroic film is totally reflected off the incidence plane of the color separation/composition prism 5312 and incident to the first spatial light modulator 5100 at a desired angle of incidence. The modulated light that is reflected off the first spatial light modulator 5100 is totally reflected off the incidence plane of the first color separation/composition prism 5312, reflected off the first dichroic film, and enters the projection light path.

Blue and green illumination lights that have passed through the first dichroic film enter the second color separation/composition prism 5313. A second dichroic film that reflects only blue is disposed on the joined surface of the second color separation/composition prism 5313 and the third color separation/composition prism. Therefore, the blue illumination light is separated from the illumination light incident on the second color separation/composition prism 5313 and reflected off the second dichroic film. The reflected blue illumination light is totally reflected off the light incidence plane of the second color separation/composition prism 5313 and incident to the second spatial light modulator 5101. The light modulated by the second spatial light modulator 5101 is reflected off the incidence plane and the second dichroic film and directed to the projection light path. The green light that has passed through the second dichroic film is modulated at a third spatial light modulator 5102 and reflected into the projection light path. The red, blue, and green lights modulated at the first, second and third spatial light modulators 5100, 5101 and 5102 and reflected into the same projection light path pass through the total reflection surface of the TIR prism 5311 and are projected onto a projection surface through a projection lens 5400.

In such a configuration, in which each of the primary colors is projected at all times, as compared to a single-plate projection apparatus described above, there will be no visual problem such as color breakup. Furthermore, effective use of light from the light source provides a bright image. On the other hand, adjustment of the configuration, for example, aligning the spatial light modulators to correspond to the respective color light beams, will be more complex and result in the increased size of the apparatus.

It is therefore desirable to provide a projection apparatus that will not suffer from color breakup using a simple single-plate optical configuration. A method for eliminating the above problem by coloring each micromirror element with a coloring resist was disclosed in U.S. Pat. Nos. 5,168,406, 5,240,818 and 5,452,138.

However, the patented inventions in these patents have further difficulties. Specifically, when the thickness of the coloring resist exceeds a certain thickness, such as when the thickness is one to three micrometers thicker than that of the actual mirror, and furthermore, when a protective layer is provided on the coloring resist, it is difficult to ensure the flatness of the mirror. In this case, as the thickness and hence the mass of the mirror increases, the natural frequency of the mirror increases accordingly, thus resulting in further difficulty in driving the mirror at high speeds.

On the other hand, JP-A-9-101468 discloses a configuration in which a diffraction grating is formed on the mirror. In this case, however, it is necessary to direct diffracted color light beams in the same direction and guide them into a projection lens. The apparatus has a disadvantage due to the complex configuration that leads to higher production costs and further difficulties in control and operation.

The invention has been made in view of the above problems and aims to provide an image projection apparatus having a simple optical configuration that does not suffer from color breakup. The display image projection system of this invention achieves a higher level of display gray scales by providing a sub-wavelength grating (SWG) having a period smaller than the wavelength of light on a mirror so as to form a mirror element that reflects light having a specific wavelength.

SUMMARY OF THE INVENTION

It is one aspect of this invention to take advantage of an ultra-fine processing technology available in recent years used in semiconductor manufacture and micro-machining to fabricate a sub-wavelength grating (SWG) having a pitch between the grating ridges that is smaller than the wavelength of light. The SWG is known to generate a structural color found in scales attached to butterfly wings. Although various optical effects, such as interference, scattering and diffraction, are considered to be involved, a resonance effect selectively generated at a specific wavelength through scattering in the gratings formed o the mirror surface as microstructure and multiple reflections in the periodic structure is considered to be one of the causes of the generation of the vivid color.

Another aspect of the present invention is related to a spatial light modulator that includes a resonance reflection filter on the pixel display elements. The spatial light modulator comprises a deflectable mirror device, which includes a resonance reflection filter structure formed on the mirror surface so that the mirror can reflect light of prescribed frequency.

Another aspect this invention is related to a projection apparatus that includes a spatial light modulator with a monochromatic light source and at least one spatial light modulator, so that enable display apparatus to display a full-time and full-color image. Preferably, the prescribed frequency is substantially equal to the frequency of the monochromatic light source in order to achieve better efficiency.

These and other objects and advantage of the present invention will no doubt become obvious to those of ordinary skill in the art after having read the following detailed description of the preferred embodiment, which is illustrated in the various drawing figures.

BRIEF DESCRIPTION OF THE DRAWINGS

The present invention is described in detail below with reference to the following Figures.

FIGS. 5A and 5B show a deflectable micromirror supported on a deformable hinge for providing flexibility of control to increase the gray scales of image display.

FIGS. 6A and 6B show a reflective grating and optical transmissive grating implemented on a surface of a micromirror in a spatial light modulator of this invention.

DESCRIPTION OF THE PREFERRED EMBODIMENT

Figure 1A:
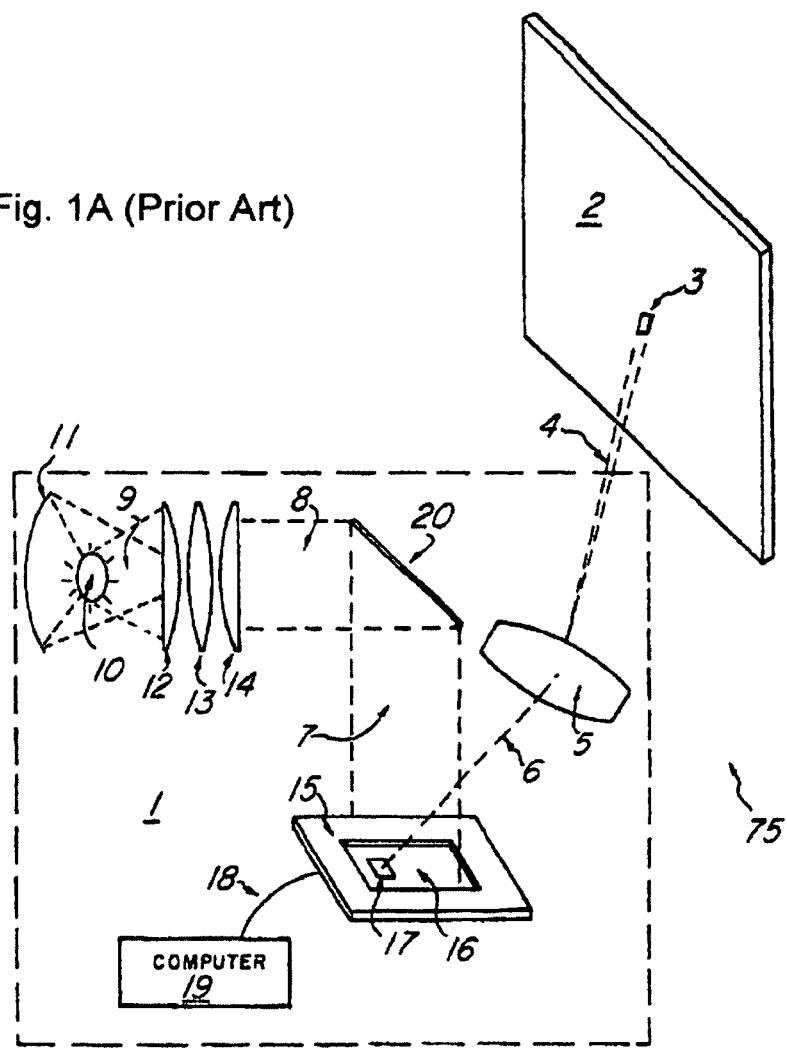
FIGS. 1A and 1B are functional block diagram and a top view of a portion of a micromirror array implemented as a spatial light modulator for a digital video display system of a conventional display system disclosed in a prior art patent.
Figure 1B:
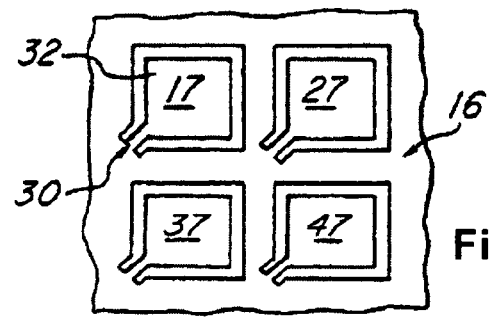
Figure 1C:
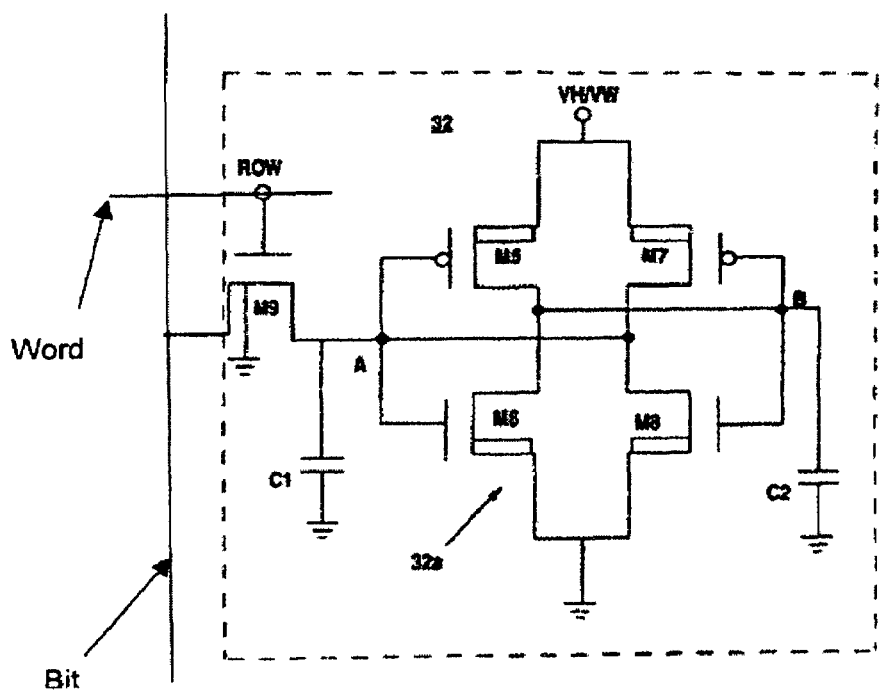
FIG. 1C is a circuit diagram for showing a prior art circuit for controlling a micromirror to position at an ON and OFF states of a spatial light modulator.
Figure 1D:
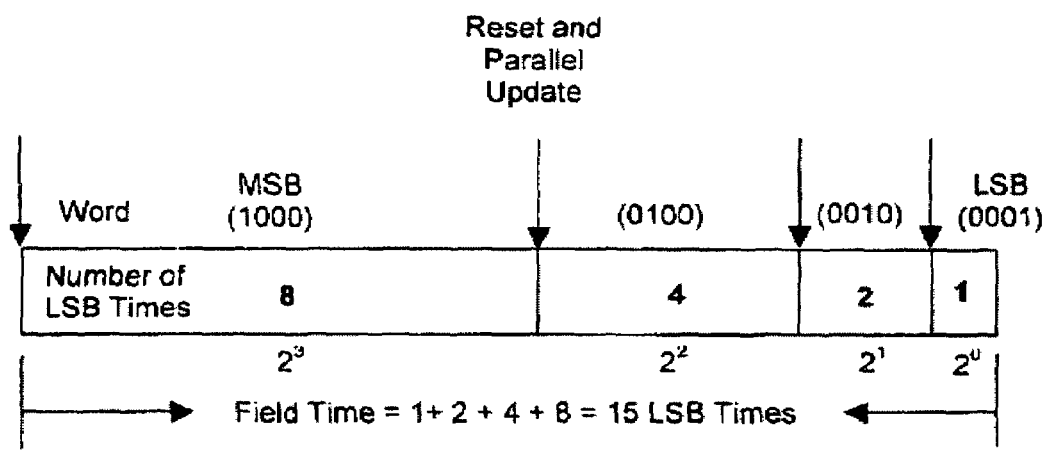
FIG. 1D is diagram for showing the binary time intervals for a four bit gray scale.
Figure 1E:
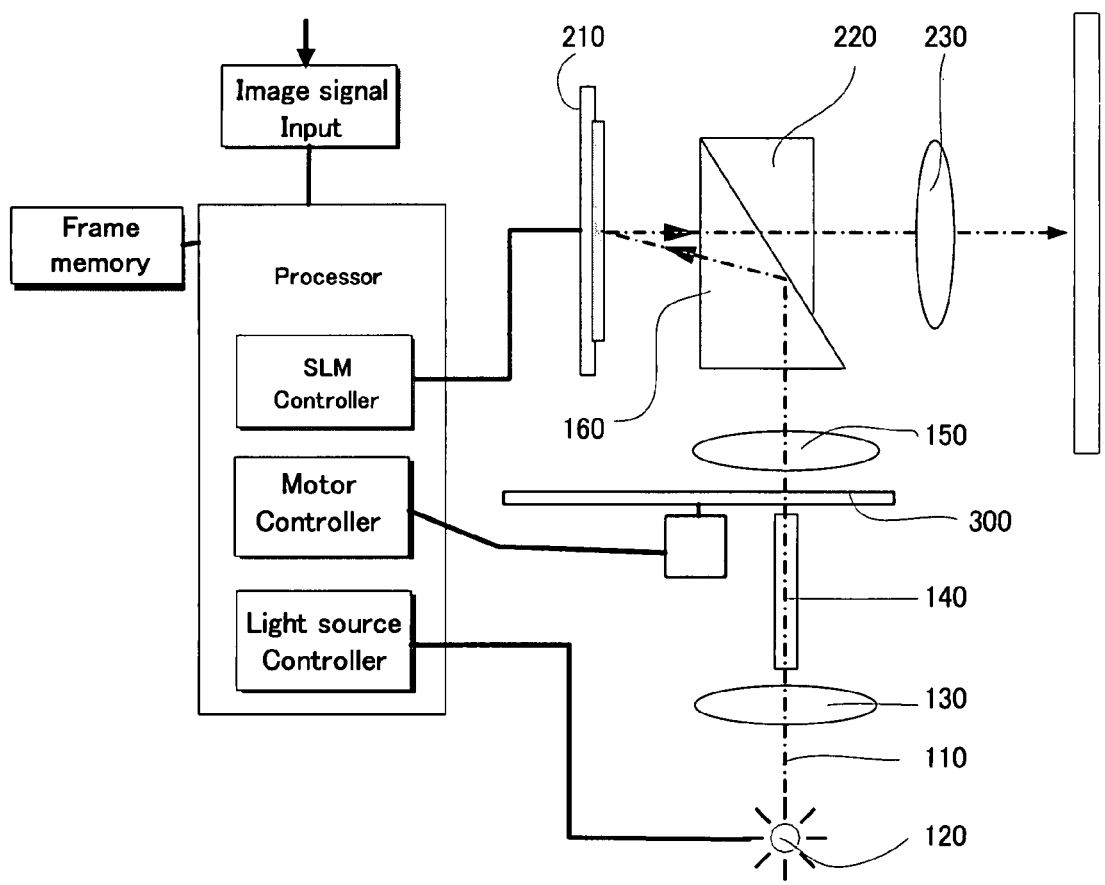
FIGS. 1E, 1F, and 1G are projection functional block diagrams for showing prior art projection systems.
Figure 1F:
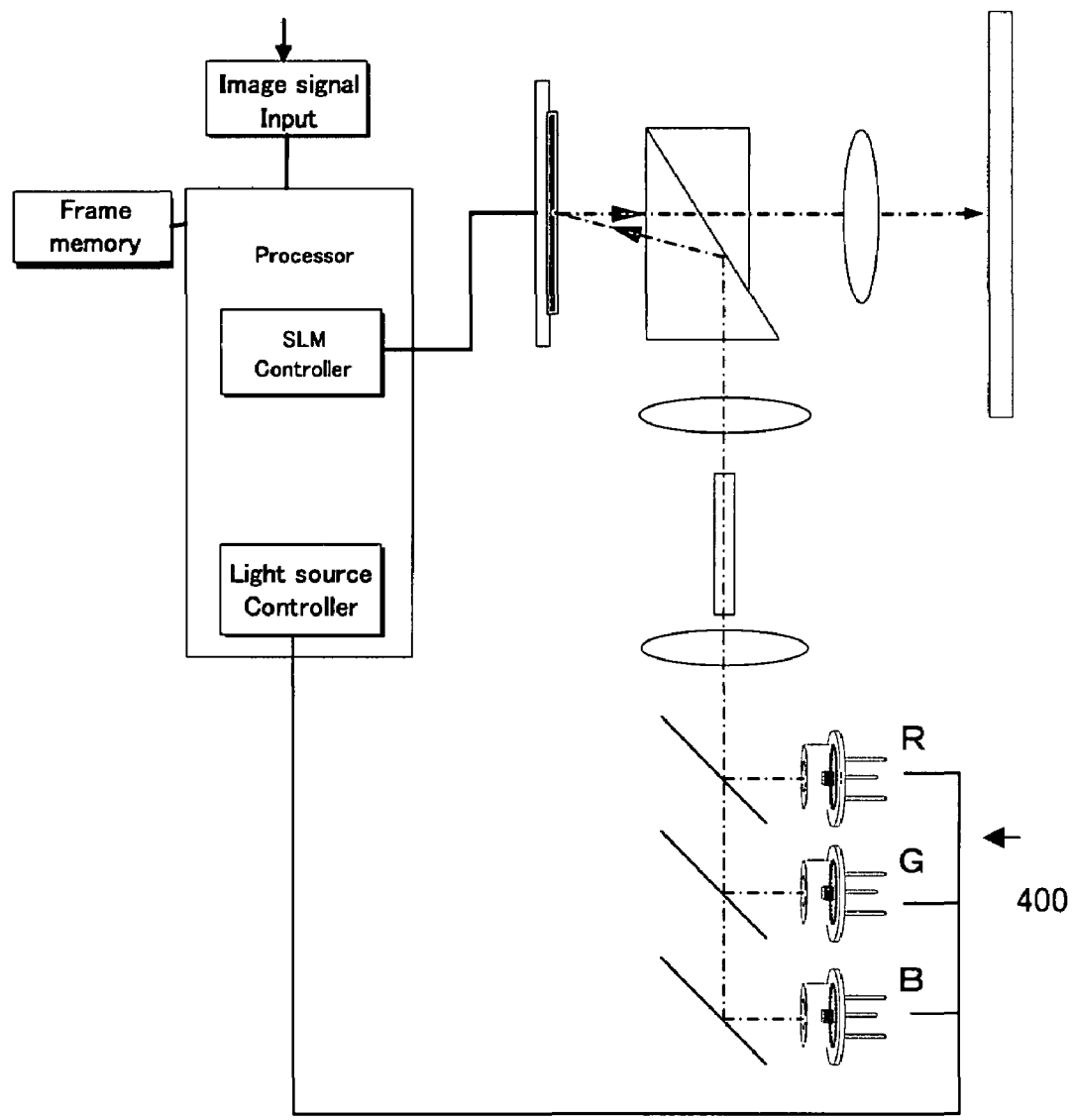
Figure 1G:
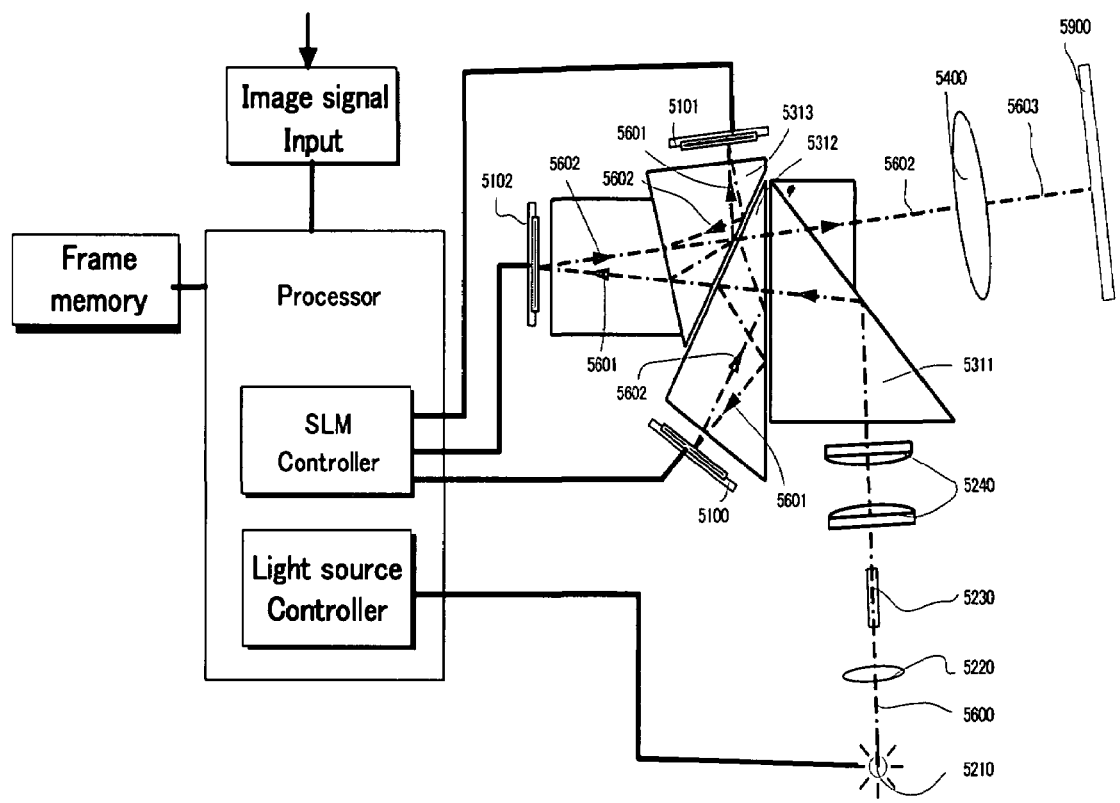
Figure 2A:
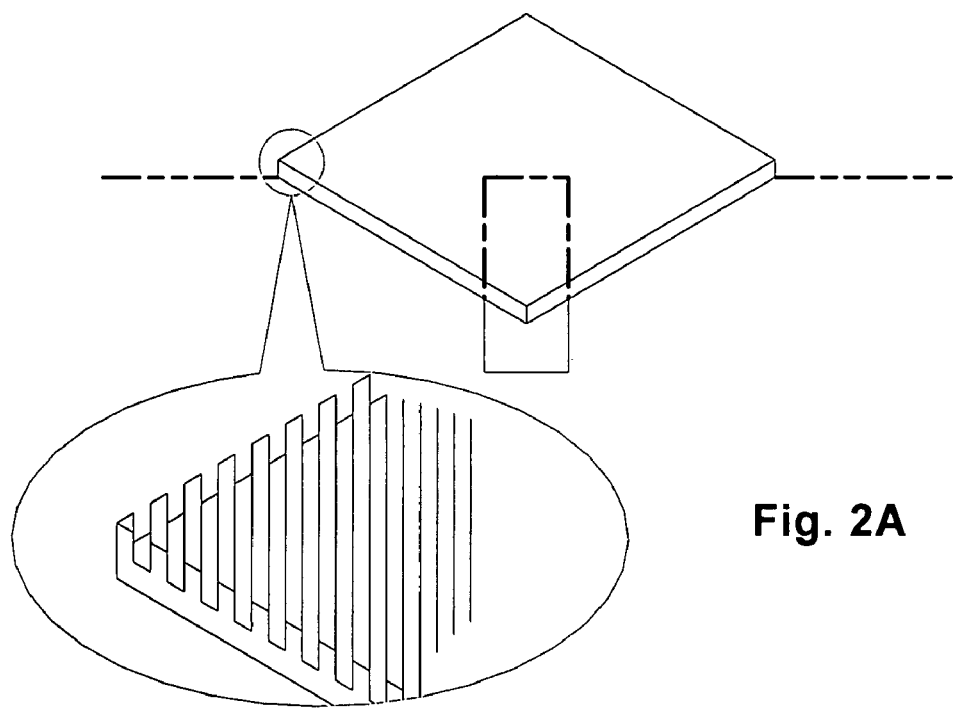
FIGS. 2A to 2C show a micromirror with sub-wavelength gratings formed on the surface of the micromirrors of this invention implemented in a spatial light modulator.
Figure 2B:
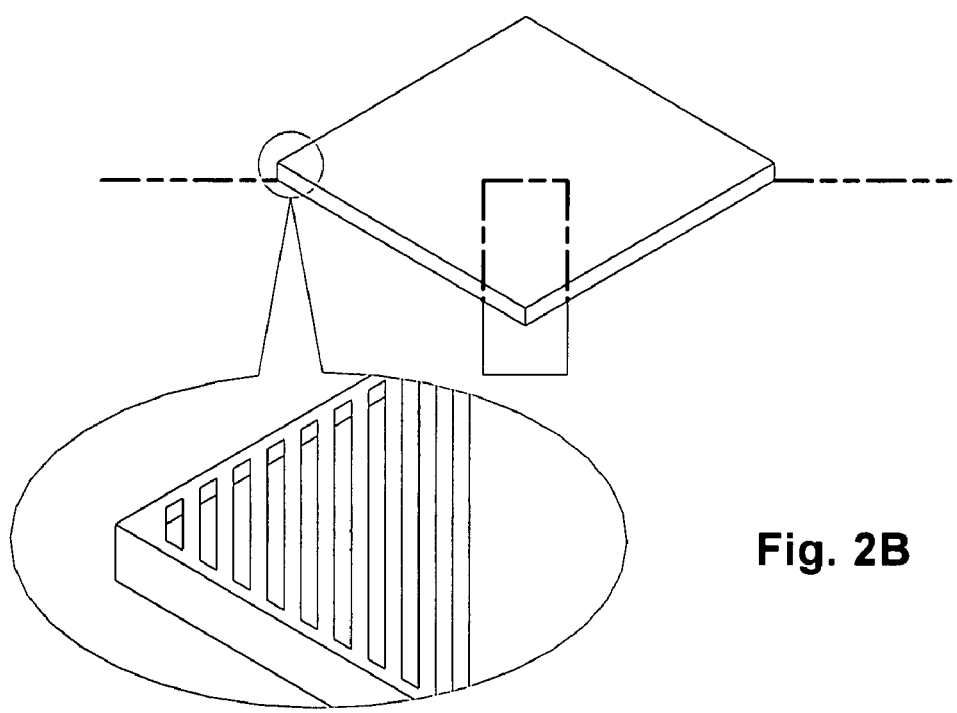
Figure 2C:
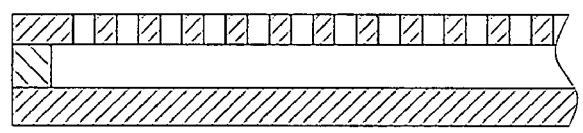

FIGS. 2A to 2B show a preferred embodiment of this invention that includes a micromirror device with two different of sub-wavelength gratings as a microstructure disposed on the mirror surface, and FIG. 2C shows a side cross sectional view of the micromirror. The micromirror device includes a plurality of deflectable micromirrors to reflect a light projected with a prescribed frequency. In an exemplary embodiment, the sub-wavelength grating is a reflection-guided mode resonant grating filter. The micromirror device as shown in FIGS. 2A to 2C may be implemented in a system that has a monochromatic light source. This display system further includes a micromirror device that has a plurality of deflectable micromirrors for reflecting a light of the prescribed frequency by the sub-wavelength grating disposed on the mirror surface. Furthermore, the prescribed frequency of the light projected to the micromirror is substantially equal to the frequency of the monochromatic light source.

Figure 3A:
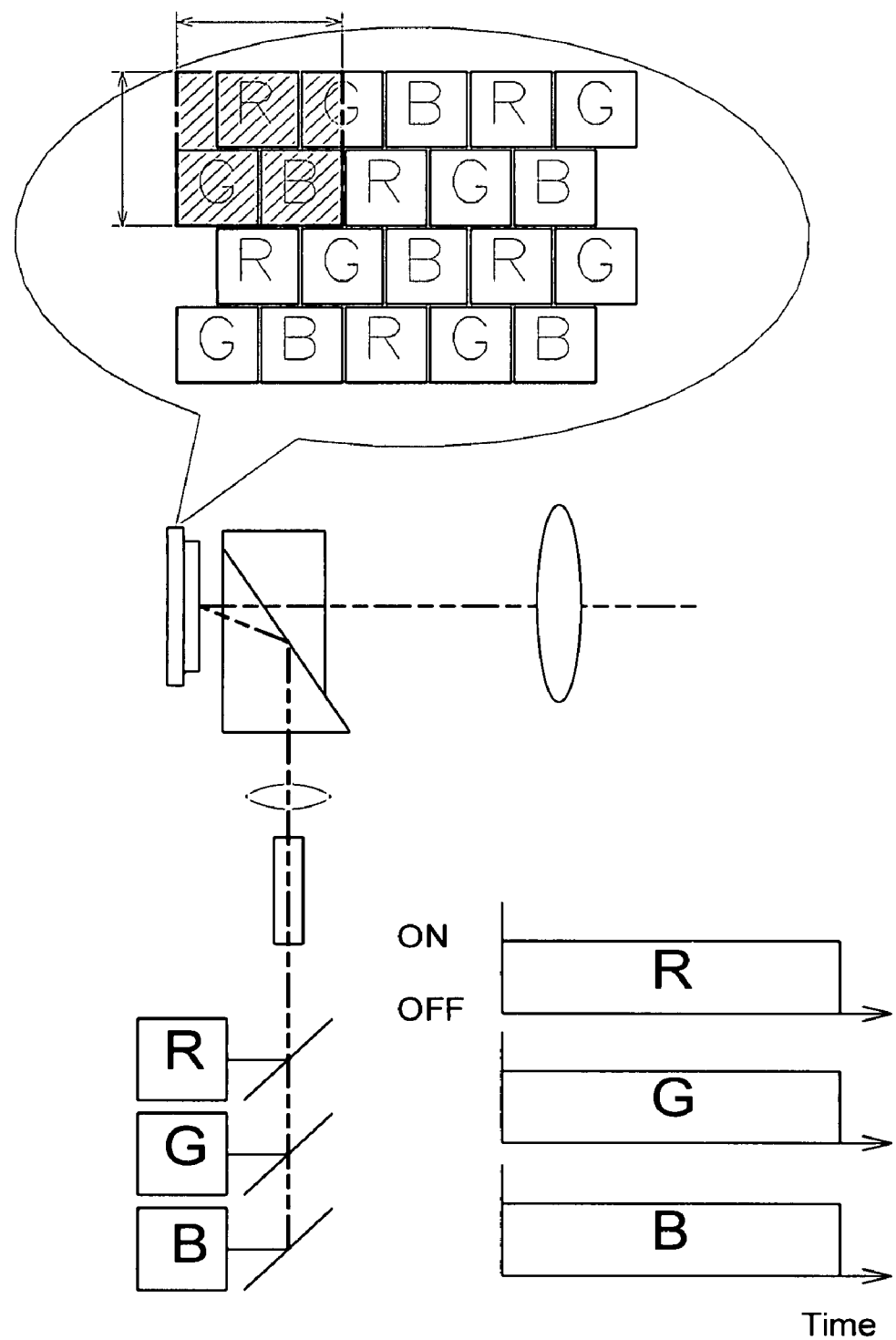
FIG. 3A shows a light projection system with a plurality of monochromatic light sources projecting light of different colors.
Figures 1, 3B:
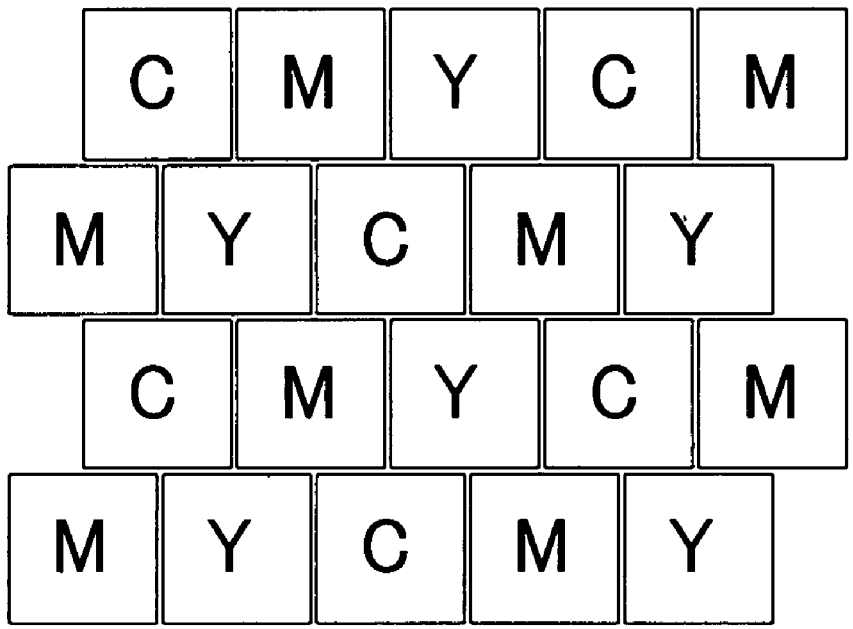
FIGS. 3B-1 and 3B-2 show different arrangements of the pixels with sub-wavelength grating wherein the symbol "W" represents a pixel that the pixel reflects lights of all of colors.

FIGS. 3A and 3B depict a projection display system that includes a plurality of monochromatic light source. The display system further includes a micromirror device that has a plurality of deflectable micromirrors to reflect the light of a prescribed frequency by the sub-wavelength grating disposed on the mirror surface of the micromirror.

Figures 2, 3B:
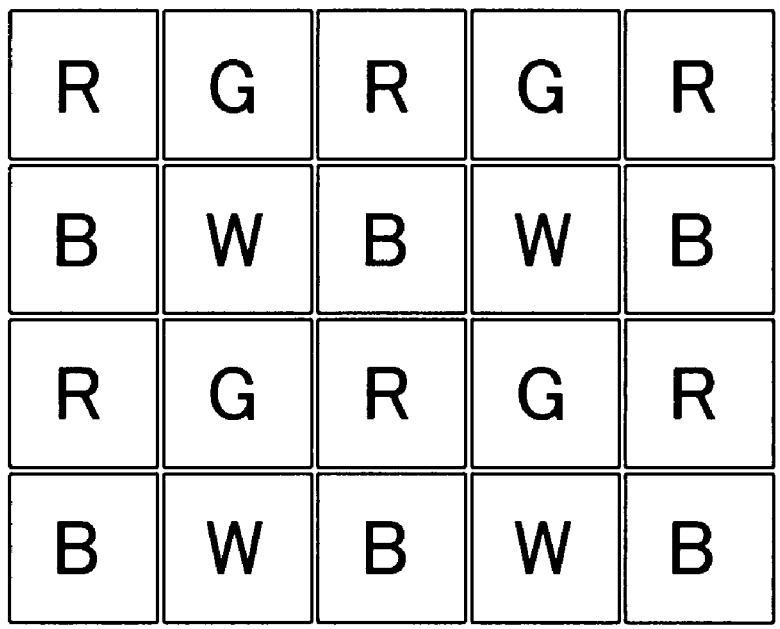
Figure 3C:
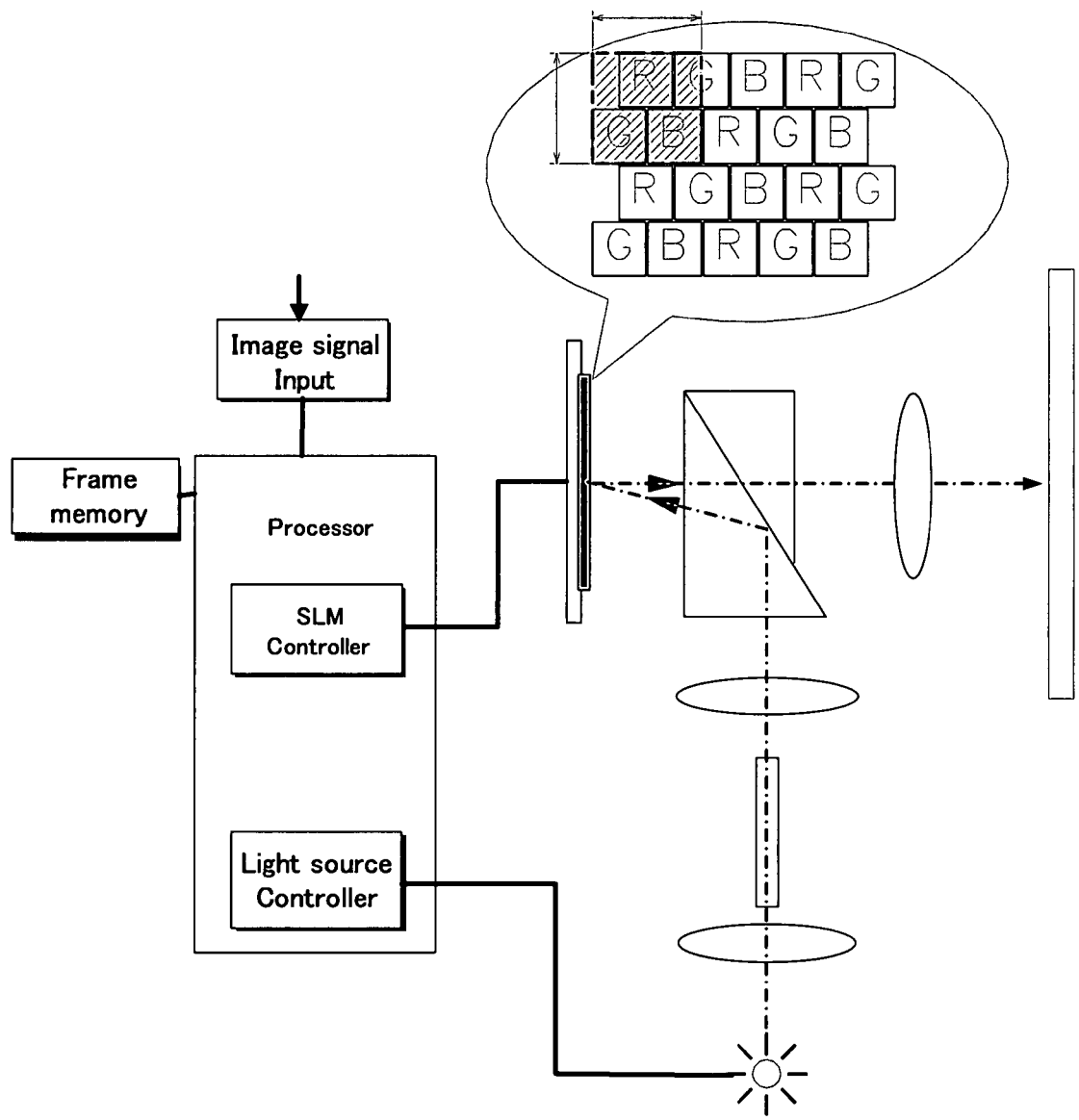
FIG. 3C is a functional block diagram that shows another light projection system implemented with the micromirror device of this invention.

In one embodiment shown in FIGS. 3B-1, each micromirror reflects red, green or blue light. In another embodiment shown in FIGS. 3B-2, each micromirror reflects cyan, magenta or yellow light. The layout of the micromirror might be in a cross-stitched or grid array. FIG. 3C shows another projection system that includes a light source of multiple frequencies such as a super high-pressure mercury capillary lamps or Xenon lamp.

Figure 4A:
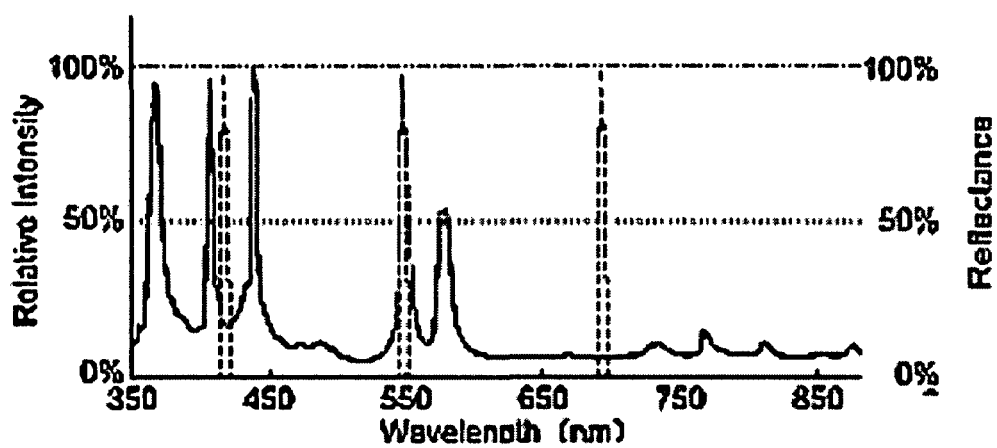
FIG. 4A and 4B shows the spectrum of conventional light sources.
Figure 4B:
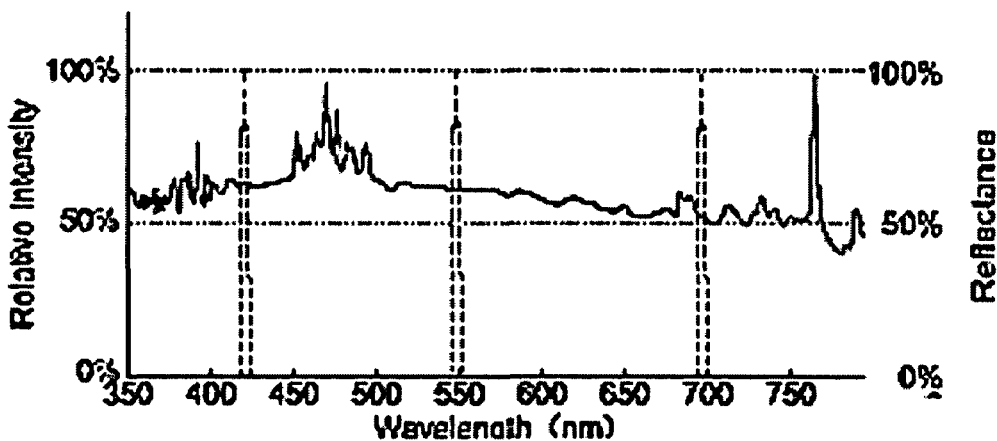
Figure 4C:
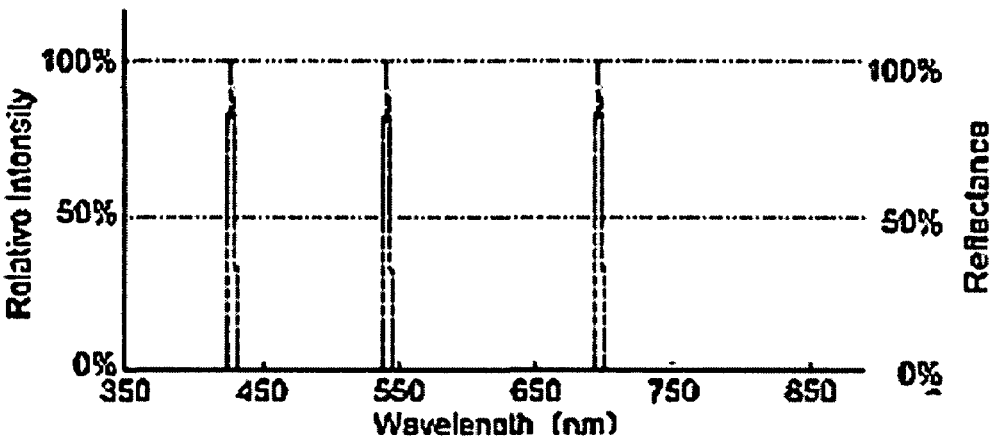
FIG. 4C shows the laser light source of this invention that enables the projection system to utilize the entire intensity of the light source thus increasing the efficiency of optical energy utilization.

In another embodiment of this invention, the light projection system reflects all of the light from the light source. FIGS. 4A and 4B show the spectrum projected from the conventional light source, wherein only a part of the incident light is reflected by a micromirror device having a sub-wavelength grating on the mirror surface. By adapting a laser as the light source and setting the reflective frequency equal to the frequency of the laser, the light is fully used, as shown in FIG. 4C, wherein the monochromatic light source is a laser source. Alternately, the monochromatic light source may be implemented with a light emitting diode (LED). In another preferred embodiment, the sub-wavelength grating is formed as a reflection-guided mode resonant grating filter.

FIGS. 5A and 5B show a micromirror implemented in an image projection system as another embodiment of this invention. A vertical hinge is implemented in FIG. 5A wherein the vertical hinge has a width W1 and an edge length of L1, and a horizontal hinge is implemented in FIG. 5B wherein the horizontal hinge has a hinge length L2 and a hinge width W2. The hinge length L2 must be shortened in order to shrink the size of the micromirrors and to reduce the pitch between the micromirrors. The image display system includes a deflectable mirror device that is supported by a deformable hinge formed on a substrate, wherein the mirror surface includes a sub-wavelength grating to reflect a light of a prescribed light frequency. The deformable hinge supports the mirror surface to change the angle relative to the substrate, with the hinge substantially perpendicular to the mirror surface. The display system further includes a control mechanism to actuate the hinge and mirror with the edge length of the mirror from four to eleven micrometers in a preferred embodiment. When a laser is applied as the light source, in order to reduce the effect caused by an etendue problem and to minimize the micromirror array, the pitch between adjacent mirrors is configured to have a length between 4 to 12 micrometers to operate with allowable stress imposed on the hinges and within the limit of resolution.

According to above descriptions and illustrations shown in the drawings, this invention further discloses a spatial light modulator having a plurality of micromirrors each for reflecting image display pixels. Each of the micromirrors includes sub-wavelength grating to reflect or transmit a light of a prescribed frequency. In an exemplary embodiment, the sub-wavelength grating is a reflection-guided mode resonance grating filter. This invention further discloses an image projection system that includes such a spatial light modulator. Furthermore, the image display system further includes a monochromatic light source and a spatial light modulator having a plurality of pixels that includes sub-wavelength grating to reflect or transmit the light of the prescribed frequency. The prescribed frequency is substantially equal to the frequency of a monochromatic light source.

In an alternate embodiment, the invention further discloses an image projection display system that includes a plurality of monochromatic light sources and a spatial light modulator having a plurality of micromirrors, each comprising a sub-wavelength grating to reflect or transmit the light projected from light sources projecting different colored lights. The sub-wavelength grating reflects or transmits one of the frequencies of the light emitted from said monochromatic light sources, so that the spatial light modulator can reflect all of the light from said light source.

FIGS. 6A and 6B show the sub-wavelength grating as a microstructure disposed on the surface of a micromirror that is either a reflection or a transmission-guided mode resonant grating filter. Furthermore, the sub-wavelength grating, as shown in FIG. 6, may be implemented in a projection image display system. The display system may include a monochromatic light source such as a laser light source. Alternately, the light source may be a light emitting diode (LED) light source.

Figure 7A:
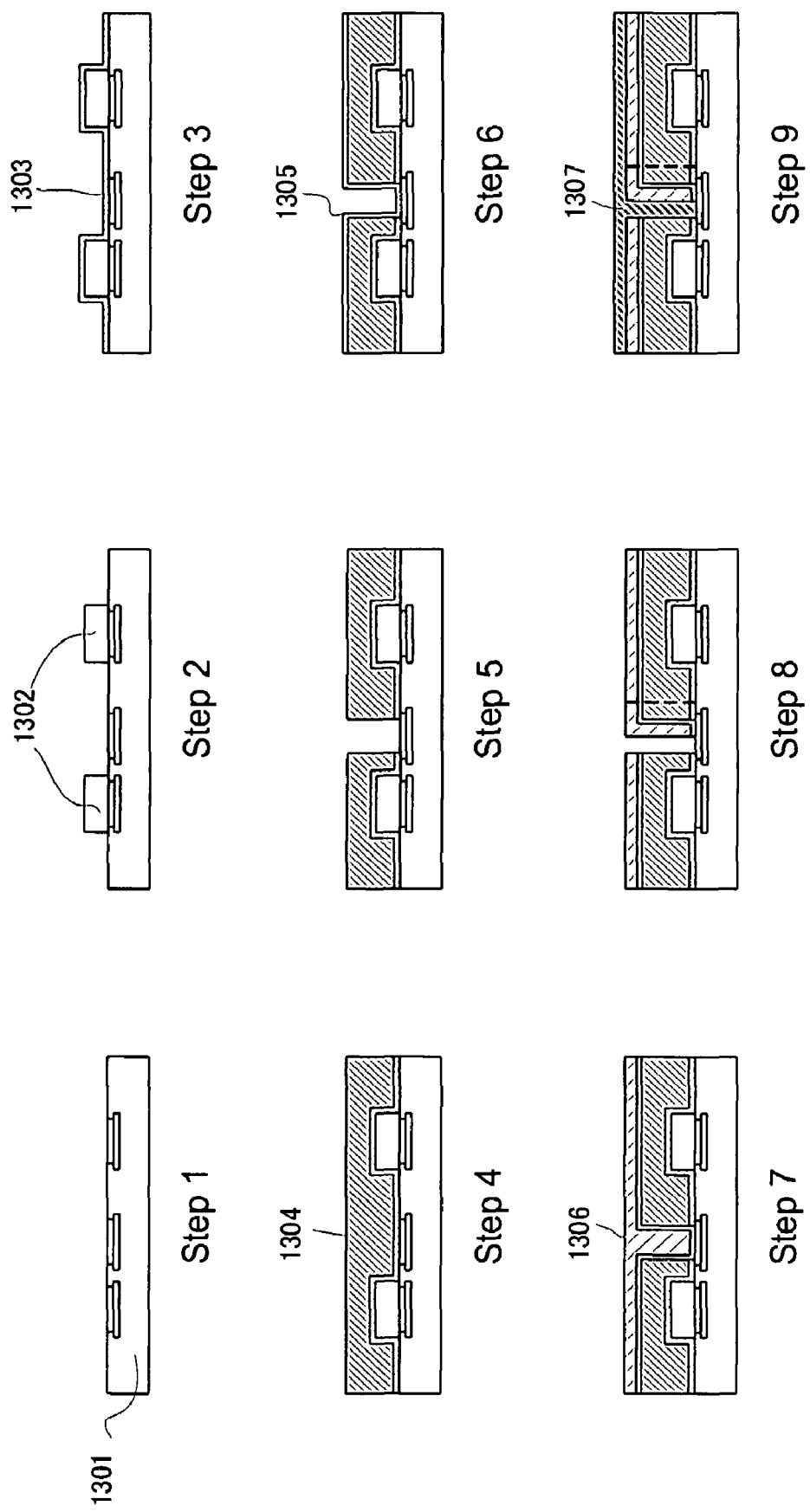
FIGS. 7A and 7B show a manufacturing process of the micromirror device of the invention.
Figure 7B:
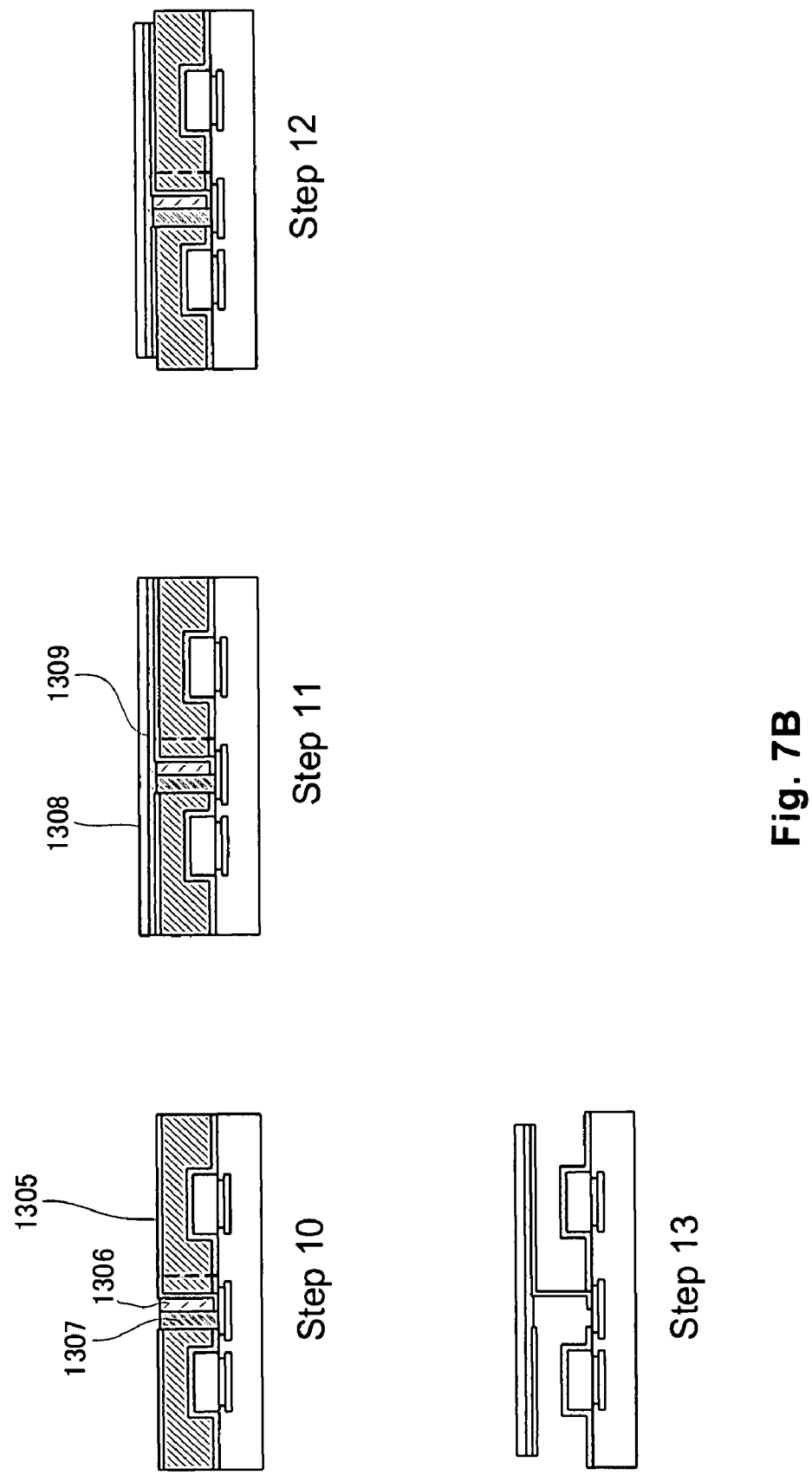

FIGS. 7A and 7B are a series of side cross sectional views for showing an exemplary manufacturing process of the mirror device according to this embodiment.

In FIG. 7A, step 1, a drive circuit and a wiring pattern (not shown) for driving and controlling the mirrors are formed in a semiconductor wafer substrate 1301.

In the step 2, the addressing electrodes 1302 connected to the drive circuit are formed. Then, the drive circuit formed in the semiconductor wafer substrate 1301 is tested to check if there are abnormalities in the operation of the drive circuit and to assure connection continuity of the addressing electrodes 1302. If no abnormality is detected in this step, the process proceeds to the next step.

In the step 3, an insulation layer 1303 is formed on the addressing electrodes 1302. The insulation layer 1303 prevents electrical short circuit during the mirror operation and also prevents the electrodes from being eroded through etching in a subsequent step. The insulation layer 1303 may be composed of insulation materials include Sic, $Si_3N_4$ and Si.

In the step 4, a first sacrificial layer 1304 is deposited on the semiconductor wafer substrate 1301 covering over the drive circuit and the addressing electrodes 1302. The first sacrificial layer 1304 is used to form mirror surfaces in a subsequent step, with a space provided between each of the mirror surfaces and the semiconductor wafer substrate 1301. In an exemplary embodiment, the first sacrificial layer 1304 comprises a $SiO_2$ layer. In this embodiment, the thickness of the first sacrificial layer 1304 determines the height of the elastic hinge that supports the mirror.

In step 5, an etching process is used to remove a part of the first sacrificial layer 1304. The height and the shape of the elastic member 1305 formed in a subsequent step are determined.

In step 6, the elastic member 1305, including a section connected to the semiconductor wafer substrate 1301, is deposited on the semiconductor wafer substrate 1301 and the first sacrificial layer 1304 formed in the step 4. The elastic member 1305 is to function as the elastic hinge that supports the mirror. In an exemplary embodiment, the elastic member 1305 is composed of silicon, such as Si single crystal, polysilicon and a-Si, metals, such as aluminum and titanium, and alloys of these metals. By adjusting the amount of deposition of the elastic member 1305 in this step, the final thickness of the elastic hinge is determined.

In step 7, a photoresist 1306 is deposited on the structure on the semiconductor wafer substrate 1301 formed in the previous steps.

In step 8, a mask is applied to expose the photoresist 1306, and the elastic member 1305 deposited on the semiconductor wafer substrate 1301 is etched to the desired shape. The etching process in this step divides the elastic member 1305 deposited on the semiconductor wafer substrate 1301 in step 6 into individual elastic hinges corresponding to individual mirrors of the mirror elements in the mirror device.

In step 9, a second sacrificial layer 1307 is deposited on the structure on the semiconductor wafer substrate 1301. The composition of the second sacrificial layer 1307 may be the same as that of the first sacrificial layer 1304. For example, the second sacrificial layer may be a $SiO_2$ layer. The second sacrificial layer 1307 is as high as or higher than the upper surface of the elastic hinge.

In step 10 shown in FIG. 7B, the photoresist 1306 and the second sacrificial layer 1307 deposited on the semiconductor wafer substrate 1301 are polished until the upper surface of the elastic member 1305 to function as the elastic hinge is exposed.

In step 11, a mirror layer 1308 is deposited and connected to the upper surfaces of the photoresist 1306 and the elastic member 1305. The exemplary materials of the mirror layer 1308 may include aluminum, gold and silver. Furthermore, in order to support the mirror layer 1308 and strengthen the connection to the elastic hinge, and in order to prevent a stopper from adhering to the mirror when the mirror is deflected, the mirror support layer 1309 is made of a material different from that of the mirror. For this reason, the mirror layer and the elastic member are formed with different materials. The exemplary material of the mirror support layer 1309 may include titanium and tungsten.

In step 12, a photoresist (not shown) is coated on the mirror layer 1308. A mask is used to expose the photoresist according to the pattern of a mirror array for etching into individually divided mirrors with the patterned shapes. Since the first sacrificial layer 1304, the photoresist 1306 and the second sacrificial layer 1307 are still present underneath the mirror; no direct external force is applied to the elastic member 1305. In a subsequent process to form the mirror and hinge structure, there is an option to divide the semiconductor wafer substrate 1301 into individual mirror devices. Furthermore, it is advantageous to form a protective layer on the mirror layer 1308 for preventing a reduction in reflectance resulting from foreign matter attached to the mirror surface or scratches on the mirror layer 1308. By further depositing the protective layer on the mirror layer 1308, there are additional benefits because the protective layer can prevent contamination of the elastic member 1305 due to the attachment of foreign matter. The protective layer can further prevent the destruction of the elastic member 1305, attachment of foreign matter to the mirror and scratches when a dicing process is performed to divide the semiconductor wafer substrate 1301 into a plurality of individual mirror devices.

In step 11 or 12, nano-imprinting or other methods is used to form a sub-wavelength grating that has a pitch between the grating ridges smaller than the wavelength of light on the mirror surface. Exemplary methods for forming the sub-wavelength grating may include a chemical method as well as nano-imprinting.

The mirror devices on the wafer are divided into individual mirror devices. The dicing step for dividing the semiconductor wafer substrate 1301 into individual mirror devices includes the sub-steps of attaching a UV tape to the backside of the semiconductor substrate. The UV tape loses adhesion upon application of UV light. Then, the entire semiconductor wafer substrate 1301, along with the UV tape, is mounted onto a frame of the dicing apparatus. A circular blade of a diamond saw is applied to cut the semiconductor wafer substrate 1301. After the semiconductor wafer substrate is divided into individual mirror devices, the UV tape is stretched to pull the cut mirror devices so as to create gaps between individual mirror devices. Therefore, the individual mirror devices are completely separated from each other. Then, when UV light is applied to the backside of the UV tape (attached to the backsides of the separated individual mirror devices), the adhesion is lost and the mirror devices 1401 easily separate from the UV tape. The dicing step is not limited to the diamond saw cutting described above, but may be performed by other methods, such as laser cutting, a high pressure water stream cutting, etching scribe lines using another etchant, and reducing the thickness of the semiconductor wafer substrate after scribe lines are formed.

In step 13 of FIG. 7B, the first sacrificial layer 1304, the photoresist 1306, the second sacrificial layer 1307 and the protective layer are removed using an appropriate etchant. The mirrors protected by these layers become deflectable. The elastic members 1305 and the mirror layers 1308 are formed on the semiconductor wafer substrate 1301 and are deflected by applying electric signals to the drive circuit and electrodes.

Then, the mirrors undergo an anti-stiction treatment for preventing adherence of the moving portions. Furthermore, the mirror is prevented from contacting the electrode in order to prevent the normal control from being disabled.

Finally, the completed mirror device is encapsulated in a package into a product.

The spatial light modulator manufactured by applying the above-described processes allows for full-time and full-color display, unlike the conventional SLM that allows only for time division display of individual colors from the conventional single-plate projection apparatuses. Furthermore, the image display system provides image display through a simple optical configuration without the color breakup problem.

Although the present invention has been described in terms of the presently preferred embodiments, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. An image projection device receiving a light from a light source through an illumination optic for projecting to a spatial light modulator having a plurality of deflectable micromirrors wherein said micromirrors further comprising:
    a sub-wavelength microstructure on a reflective surface of said micromirrors to reflect a specific wavelength in said light from the light source through a resonant scattering from said sub-wavelength microstructure.

2. The image projection device of claim 1 wherein:
    said sub-wavelength microstructure further comprising a reflection guided mode resonant grating for reflecting said light of said specific wavelength.

3. The image projection device of claim 1 further comprising:
    a semiconductor substrate supporting electrodes and deflectable hinges thereon wherein said hinges support said micromirrors and electric signals are applied on said electrodes for driving and deflecting said micromirrors supported on said hinges to different inclined angles.

4. The image projection device of claim 1 wherein:
    said micromirrors further comprising at least two micromirrors different sub-wavelength structures for reflecting lights of two different wavelengths from at least two micromirrors.

5. The image projection device of claim 1 wherein:
    said micromirrors further comprising at least two micromirrors having at least two different sub-wavelength structures for reflecting lights of at least two primary colors.

6. The image projection device of claim 1 wherein:
    said micromirrors further comprising at least two micromirrors having at least two different sub-wavelength structures for reflecting lights of at least two secondary primary colors.

7. The image projection device of claim 1 wherein:
    said micromirrors further comprising a plurality micromirrors having different sub-wavelength structures for reflecting lights substantially over an entire range of spectrum projected form a light source.

8. The image projection device of claim 1 wherein:
    said micromirrors having a pitch extended between two adjacent mirrors having a length substantially between four to twelve micrometers (4 to 12 μm).

9. The image projection device of claim 1 further comprising:
    a semiconductor substrate for supporting electrodes and deflectable hinges thereon wherein said deflectable hinges support said micromirrors and electric signals are applied on said electrodes for driving and deflecting said micromirrors to different inclined angles; and
    a controller for generating said electric signals for inputting to said electrodes to control said micromirrors according to a pulse width modulation (PWM) mode.

10. The image projection device of claim 1 further comprising:
    a semiconductor substrate for supporting electrodes and deflectable hinges thereon wherein said deflectable hinges support said micromirrors and electric signals are applied on said electrodes for driving and deflecting said micromirrors and said hinges wherein said micromirrors having a distance between adjacent micromirrors ranging substantially between four to twelve micrometers.

11. An image projection device receiving a light from a light source through an illumination optic for projecting to a spatial light modulator having a plurality of deflectable micromirrors wherein said deflectable micromirrors further comprising:
    a sub-wavelength microstructure on a reflective surface of said micromirrors; and
    said micromirrors each having a specific wavelength structure for selectively reflecting or transmitting a light of a selected wavelength substantially equal to one of a wavelengths projected from said light source.

12. The image projection device of claim 10 wherein:
    said light source further comprising a laser light source for projecting lights of at least two different wavelengths corresponding to at least two of said specific wavelength structures.

13. The image projection device of claim 10 wherein:
    said light source further comprising a light-emitting diode (LED) light source for emitting a light of a specific wavelength.

14. An image projection device receiving a light from a light source through an illumination optic for projecting to a spatial light modulator (SLM) having a plurality of deflectable micromirrors each for displaying a pixel wherein said deflectable micromirrors further comprising:
- a sub-wavelength microstructure on a reflective surface of said micromirrors; and
- said micromirrors of said SLM each having a specific wavelength structure for selectively reflecting or transmitting a light of a selected wavelength substantially equal to one of a wavelengths projected from said light source.

15. The image projection device of claim 9 wherein:
said controller controlling said micromirrors to operate in said freely oscillation mode with a natural oscillation frequency as a function of an elasticity of said deflectable hinge to project a smaller amount of controllable light intensity than a fully-ON light intensity to display an image with higher levels of gray scales.

16. An image projection device comprising mirror device having a plurality of deflectable micromirrors wherein:
at least two of said micromirrors having two different reflective surfaces of two different shapes or two different structures.

17. The image projection device of claim 16 wherein:
at least two of said micromirrors having said two different reflective surfaces comprising at least two reflective surfaces of two different optical characteristics.

18. The image projection device of claim 16 wherein:
at least two of said micromirrors having said two different reflective surfaces comprising at least two reflective surfaces of two different physical characteristics.

* * * * *